United States Patent [19]

Vento

[11] Patent Number: 5,441,331
[45] Date of Patent: Aug. 15, 1995

[54] SEATING ASSEMBLY

[75] Inventor: John M. Vento, Menomonee Falls, Wis.

[73] Assignee: Concept Seating, Inc., Menomonee Falls, Wis.

[21] Appl. No.: 905,554

[22] Filed: Jun. 25, 1992

Related U.S. Application Data

[63] Continuation-in-part of Ser. No. 511,249, Apr. 19, 1990, abandoned.

[51] Int. Cl.$^6$ .............................................. A47C 7/02
[52] U.S. Cl. .......................... 297/452.33; 297/452.36; 297/452.14
[58] Field of Search ........... 297/452.3, 457.13, 457.14, 297/457.5, 457.56, 457.55, 457.65, 457.62, 457.26, 317, 329, 284.6

[56] References Cited

U.S. PATENT DOCUMENTS

| | | | |
|---|---|---|---|
| 3,581,620 | 6/1971 | Hauck | 297/217 X |
| 3,635,524 | 1/1972 | Faust | 297/452.56 X |
| 3,758,151 | 9/1973 | Re | 297/329 X |
| 4,702,522 | 10/1987 | Vail et al. | 297/452.56 |
| 4,807,931 | 2/1989 | Ishida et al. | 297/284.6 |
| 4,883,320 | 11/1989 | Izumida et al. | 297/457.30 X |
| 4,910,817 | 3/1990 | Kita | 297/452.56 X |
| 4,925,246 | 5/1990 | Corcoran | 297/466 |
| 5,013,089 | 5/1991 | Abu-Isa et al. | 397/452.56 X |

FOREIGN PATENT DOCUMENTS

| | | | |
|---|---|---|---|
| 1552382 | 1/1969 | France | 297/460 |
| 2728754 | 1/1979 | Germany | 297/460 |
| 2047088 | 11/1980 | United Kingdom | 297/284.5 |

Primary Examiner—Jose V. Chen
Attorney, Agent, or Firm—Foley & Lardner

[57] ABSTRACT

A seating assembly for use in a motor vehicle is provided. The seating assembly is advantageously configured to accommodate an occupant carrying protruding objects about his mid-torso region. In a preferred embodiment, the seating assembly includes a frame and a mount for securing the frame within a motor vehicle. The seating assembly also includes a seat supported within the base of the frame. A back assembly is provided and is secured to the back portion of the frame. The back assembly extends from the lower region to the upper region of the back portion of the frame and at least one of the lower side regions of the back assembly is configured to provide a recess at the juncture of the rear region of the seat and the lower region of the back assembly. In a particularly preferred embodiment, the seating assembly is adapted for use by police officers.

14 Claims, 7 Drawing Sheets

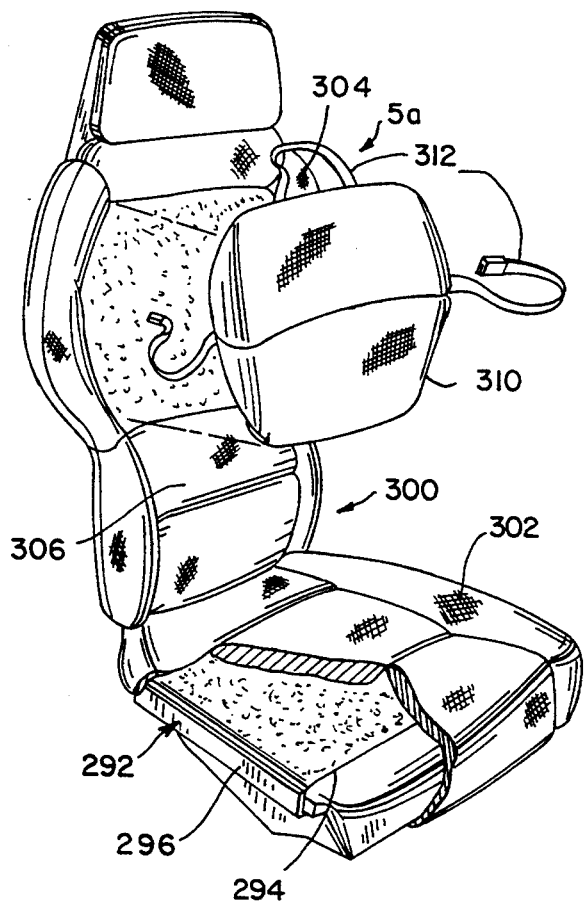
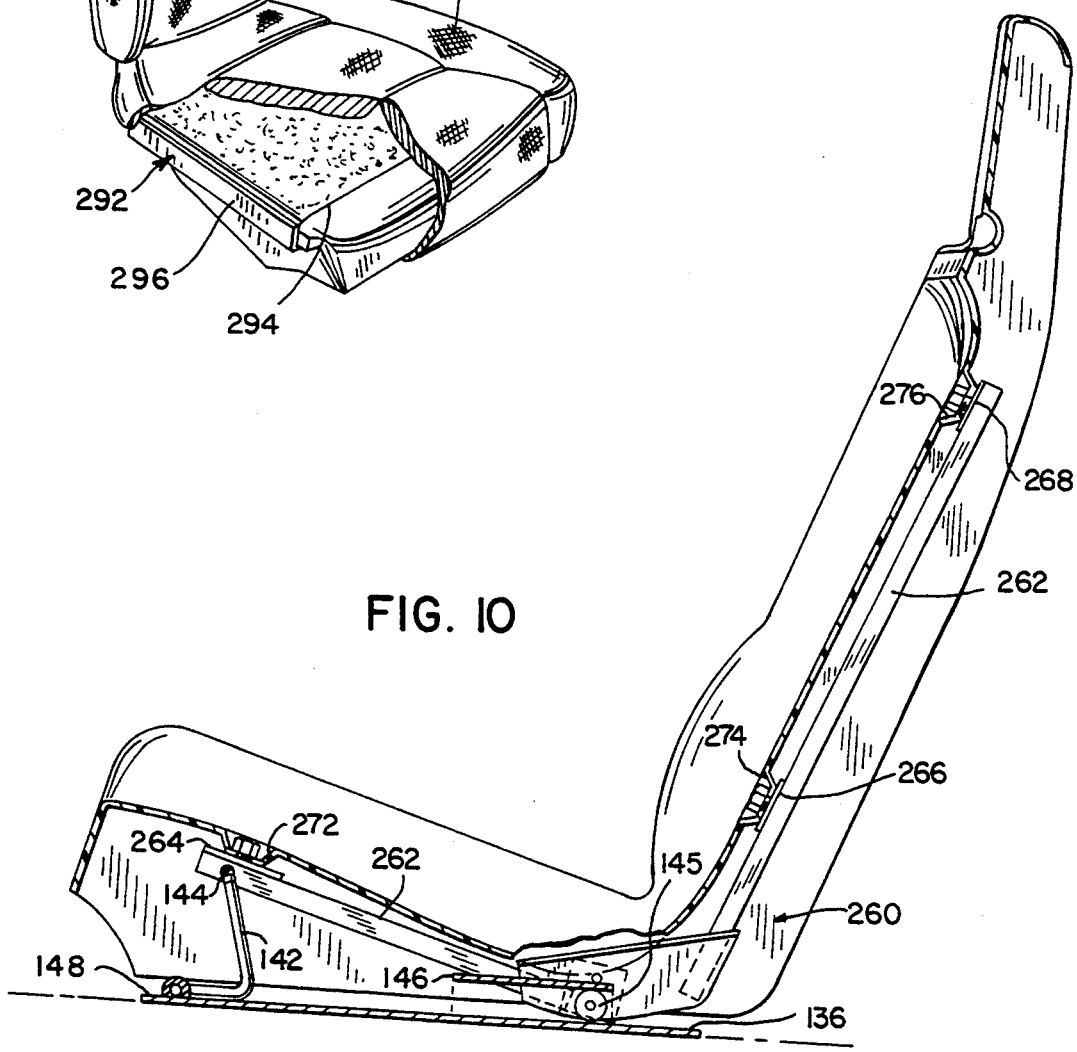

SEATING ASSEMBLY

RELATED APPLICATION

This application is a continuation-in-part of my application Ser. No. 07/511,249, filed on Apr. 19, 1990, now abandoned and entitled "Seating Assembly."

TECHNICAL FIELD OF THE INVENTION

This invention relates, in general, to a seating assembly. More particularly, this invention relates to an improved seating assembly for use in a motor vehicle, having high structural integrity, low probability of failure and improved ability to withstand hostile environments.

BACKGROUND OF THE INVENTION

Vehicle seating assemblies are typically designed to provide a minimum functionality for supporting driver and passengers. They normally include a base or seat portion on which a person sits and a back rest or seat back. The seat portion is generally formed by a frame which is mounted to the floor of the vehicle, such as an automobile. The mounting structure generally permits movement of the seat relative to the vehicle, i.e. in forward and rearward directions, typically when adjusted to a desired position by the user.

The seat back also is generally formed by a frame which extends vertically upwardly from the rear part of the base. The seat back typically is pivotally mounted with respect to the base. This enables the seat back to recline with respect to the base. Conventional locking and adjusting devices permit the seat back to be set with respect to the seat base at any of a number of angular positions. Adjustment of the seat, particularly adjustment of the seat back, while enhancing the comfort of the occupant, reduces the area lying behind the seat, i.e., leg area for the back seat. Even seating assemblies comprising a unitary frame reduce the amount of room in the back seat area when the seat is pivoted to a reclining position. This is undesirable, especially when that area is necessary to accommodate passengers, such as in an automobile.

In known seating assemblies, both the seat portion and the back portion are generally covered by cushions constructed of foam or the like. The cushions typically include some form of covering over the foam. Conventional coverings include leather, plastic and the like. These coverings, however, are highly susceptible to ripping, tearing or puncturing under applied stress. A more rugged and durable seat covering is thus desirable.

The back and seat cushions are usually attached to the respective frame portions. The cushions, particularly the seat cushions, are often supported by a suspension system secured to, or within, the seat frame comprising springs or the like. Seat and back rest cushions in the form of woven mats are also known. See Abu-Isa, et al., U.S. Pat. No. 4,869,554 issued Sep. 26, 1989. Seat web configurations have been used in other types of seating assemblies. See, Wachsmann, U.S. Pat. No. 3,708,204 issued Jan. 2, 1973; Morrison, et al., U.S. Pat. No. 3,640,576 issued Feb. 8, 1972. None of these seating assemblies, however, provides a durable suspension system which possesses high structural integrity and low probability of failure when subjected to repeated use.

Other vehicle seating assemblies are also known. For example, a pedestal seating assembly including a base shell, a back support plate, a back shell and seat and back cushions is disclosed in Bayley, U.S. Pat. No. 4,580,837 issued Apr. 8, 1986. Saives, U.S. Pat. No. 2,085,475 issued Jun. 29, 1937 discloses a seating assembly having a unitary frame. Seating assemblies formed of a fiberglass shell and seat and back insert panels for use in a transit motor vehicle are also known. Barecki, U.S. Pat. No. 3,747,978 issued Jul. 24, 1973.

Seating assemblies used in motor vehicles are often subjected to hostile environments causing excessive wear and ultimate failure. For example, automobile seats on the driver's side tend to be highly susceptible to wear, and often wear out before the automobile does. This is in large part due to repeated compression and decompression of the cushion material and/or suspension system. Excessive wear is likely, especially in cases where the driver must get in and out of the vehicle often. Conventional seating assemblies provide no means to prevent this problem at its inception or to ameliorate the problem after wear is observed.

Moreover, conventional types of seating assemblies do not provide a suitable seating assembly for motor vehicles used by persons who carry items on their belts, such as police officers. Police officers, in particular, wear a gun belt which typically carries a holster and gun. Additional items such as flashlights, bullets, etc. may also be attached to the belt. Police officers do not, and as a practical matter cannot, remove their belts and/or many of the attached items while riding in a police vehicle. This is because they may need items which they carry on their belts, such as their guns, instantaneously while inside the vehicle. Moreover, police officers often need to exit their vehicles quickly and be prepared to use the items which they carry on their belts. Therefore, they cannot afford to take the time, or the chance, to be caught inside or outside of their vehicle without their belts.

However, as noted above, conventional seating assemblies for motor vehicles do not accommodate a police officer's belt, or the items which a police officer usually carries on his belt. Thus, police officers must either sit uncomfortably in their police vehicles, or take off their belts and perhaps risk their lives and the lives of others. It thus would be desirable to have a seating assembly for motor vehicles which would accommodate a police officer's belt and the items carried on the belt.

Additionally, police officers often need additional protection, such as from gunshots, knives or the like, when they are seated in their vehicles or are in close proximity to their vehicles. While Hauck, U.S. Pat. No. 3,581,620 issued Jun. 1, 1971 discloses a laminar seat structure for aircraft which provides the pilot with more freedom to fly the ship while receiving the benefit of full protection from small-arms fire, which the pilot might otherwise be exposed to, conventional seating assemblies for motor vehicles do not provide this type of protection.

It would therefore, be desirable to provide a seating assembly which overcomes the foregoing disadvantages.

SUMMARY OF THE INVENTION

The present invention provides a seating assembly having a wide variety of uses which addresses the various disadvantages of known seating assemblies. More specifically, the seating assembly of the present invention is particularly suited for use in a motor vehicle. In a preferred embodiment, the seating assembly is advantageously configured to accommodate an occupant carrying protruding objects about his mid-torso region, for example on a belt. In accordance with that embodiment, the seating assembly is particularly adapted for use by police officers.

Further, the seating assembly of the present invention includes a specially contoured back portion and a removable bullet resistant component. This advantageously provides additional protection to the user.

In another embodiment, the seating assembly of the present invention includes a seat formed of lightweight, durable material capable of withstanding hostile environments. The seating assembly advantageously includes durable cushions which exhibit increased longevity. Further, when the cushions of the seating assembly of the present invention do wear, they can be easily and quickly replaced.

The seating assembly of the present invention also advantageously may be pivoted to a reclining position without severely reducing the amount of room in the back seat area.

In a preferred embodiment, a seating assembly for use in a motor vehicle is provided. The seating assembly includes a frame which has a base portion and a back portion. Mounting means are provided for securing the base portion of the frame within a motor vehicle. Suspension means are disposed within the base, and a seat is supported thereby. The seat is additionally secured to the base portion of the frame and a back assembly is secured to the back portion of the frame. The back assembly extends from the lower region to the upper region of the back portion. At least one of the lower side regions of the back assembly is configured to provide a recess or a pocket of open space at the juncture of the rear region of the seat and the lower region of the back assembly.

In one embodiment, the back assembly is formed of a unitary cushion, the lower portions thereof having lateral voids.

In another preferred embodiment, the back assembly includes a plurality of cushions, the lower torso cushions of which are contoured to provide recesses or pockets on each.

In yet another preferred embodiment of the present invention, a seat for use by an individual wearing a gun belt is provided. The seat includes a unitary frame assembly having a seat portion and a back portion. A seat cushion is secured to the seat portion of the frame and a back cushion is secured to the back portion of the frame. The back portion of the frame and back cushion are configured to accommodate a gun belt worn by an individual when sitting in the seat.

A further embodiment of the invention, the seat includes a unitary molded shell mounted on a frame having a seat portion and a back portion. The frame is supported on the floor of the vehicle for pivotal movement without reducing the amount of room in the back seat area of the vehicle. The unitary shell includes a seat section, a narrow lumbar section and a back section. A rim is provided around the outer periphery of the shell with a removable support assembly mounted on the rim on each side of the seat, lumbar and back sections. A cushion assembly is supported by the support assembly and secured to the rim and each side of the seat, lumbar and back sections.

DESCRIPTION OF THE DRAWINGS

The invention will be further described with reference to the accompanying drawings, wherein like numerals denote like elements, and:

FIG. 8 is a perspective view of a modified seat assembly;

FIG. 10 is a cross-sectional view of the modified seat assembly; and

DETAILED DESCRIPTION OF THE PREFERRED EMBODIMENTS

A preferred exemplary embodiment of the seating assembly according to the present invention is denoted generally by the numeral 10 in FIGS. 1 to 4. As shown, seating assembly 10 is adapted to be used as a driver's seat in a motor vehicle (not shown) such as an automobile. As will be described more fully hereinbelow, seating assembly 10 is particularly adapted to be used in a police vehicle.

Figure 1:
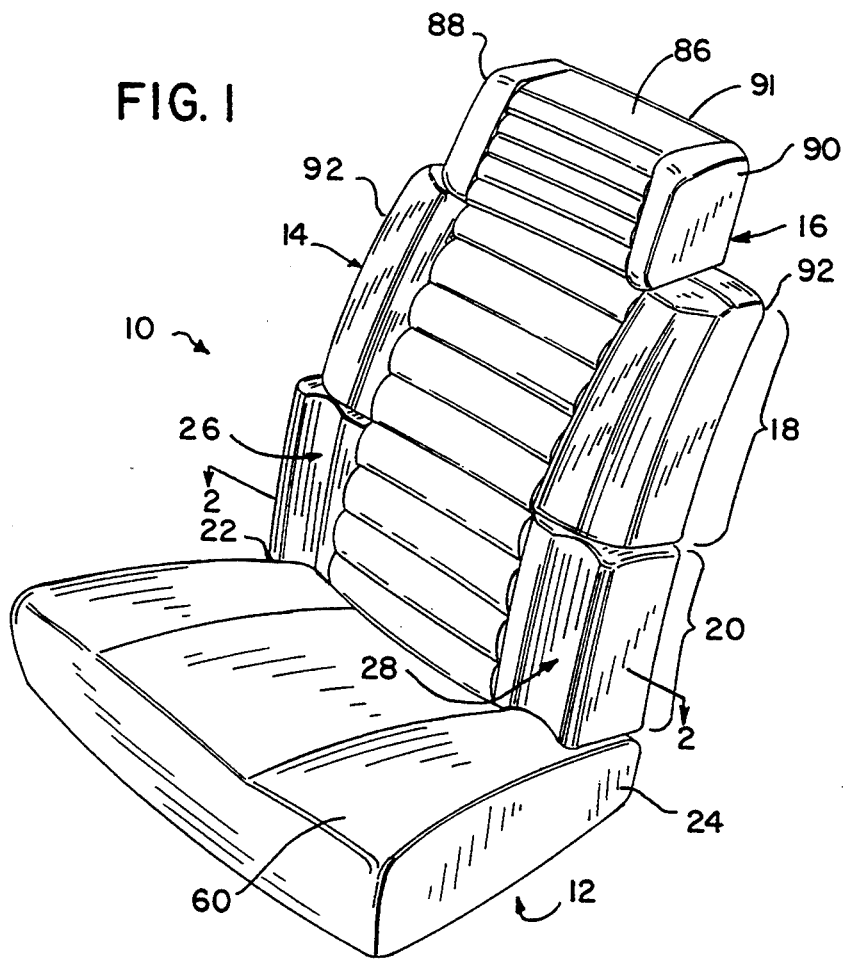
FIG. 1 is a perspective view of one embodiment of the seating assembly of the invention.

With reference to FIG. 1, seating assembly 10 includes a seat 12 and a back 14. Back 14 is comprised of a headrest portion 16 at its uppermost end, an upper back region 18, and a lower back region 20.

Figure 2:
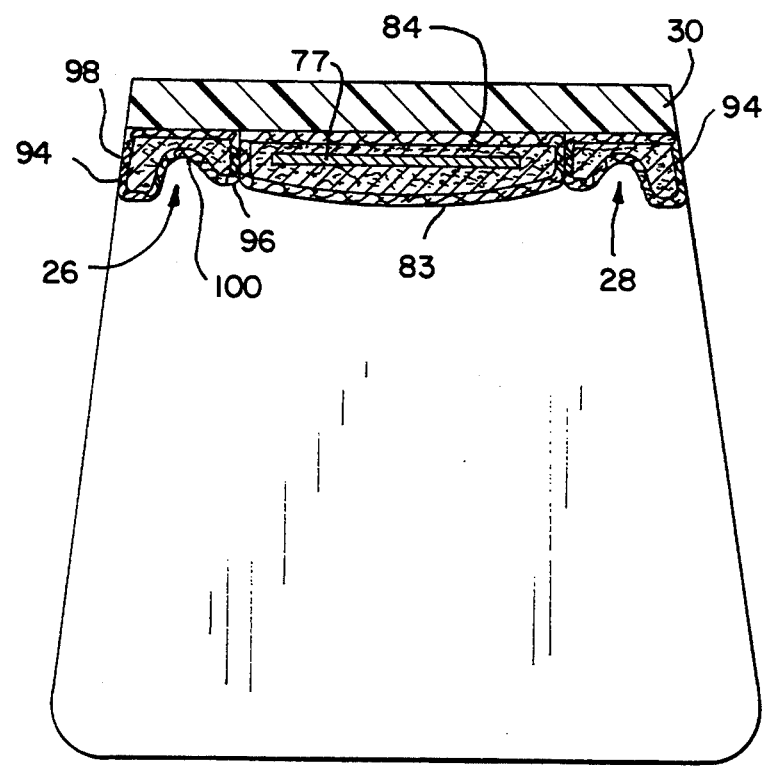
FIG. 2 is a cross-sectional view taken along the line 2—2 of FIG. 1.
Figure 3:
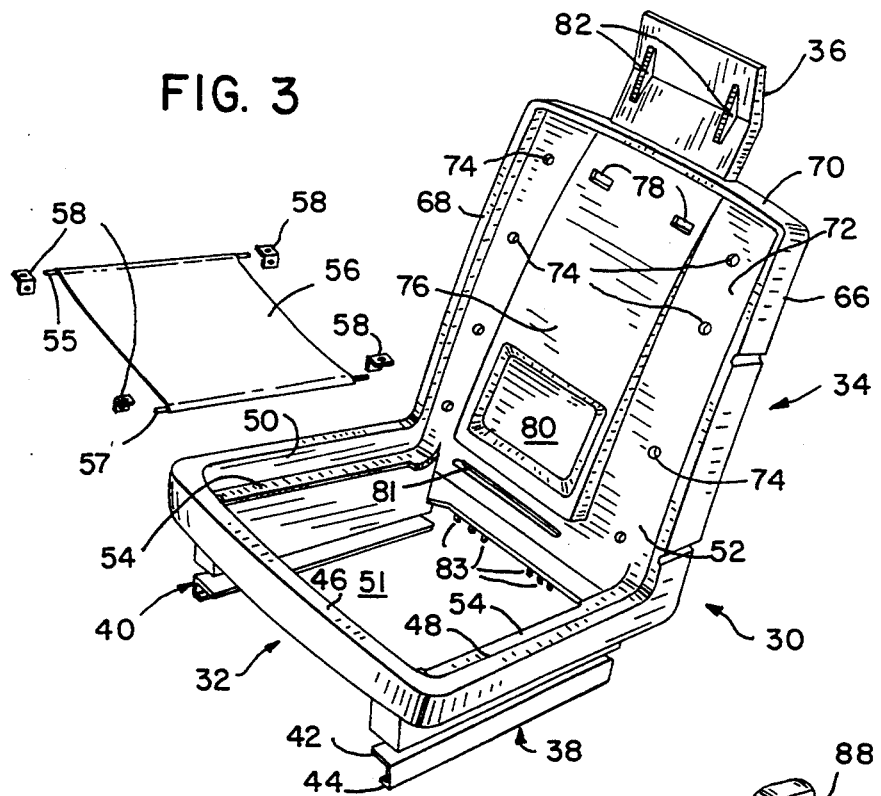
FIG. 3 is an exploded perspective view of the frame and suspension system of the seating assembly of FIG. 1.

More particularly, with reference to FIGS. 2 and 3, it can be seen that seating assembly 10 has a frame 30. Frame 30 is preferably of a unitary construction and includes a seat portion 32 and a back portion 34. Back portion 34 also has a headrest portion 36.

As is shown most clearly in FIG. 3, seat portion 32 of frame 30 includes a front bar 46 and a pair of side bars 48 and 50. A lower back area 52 of back portion 34 of frame 30, integral with side bars 48 and 50, forms the rear side of said seat portion 32. An open seating area 51 is thus defined. A continuous lip 54 extends radially inwardly of area 51 from front bar 46 and side bars 48 and 50.

Seating assembly 10 further includes a mounting device for securing seat portion 32 of frame 30 to the floor of a motor vehicle. Particularly, with reference to FIG. 3, respective mounting legs 38 and 40 extend from the lower surface of seat portion 32. Mounting legs 38 and 40 each have an upper support 42 and a lower track 44. Lower track 44 is suitably configured to engage a pin which is mounted on the floor of the motor vehicle (not shown) in conjunction with which seat 10 is to be used. It should be appreciated, however, that other means for securing seating assembly 10 are known to be useful or can be devised by those of ordinary skill in the art.

Seating assembly 10 also has a suspension system 56 which is disposed within the seat portion 32 of frame 30. In a preferred embodiment, as best seen in FIG. 3, suspension system 56 is supported by and secured to lip 54 by, e.g., the attachments 58. Attachments 58 are generally formed as an L-shaped hook and are affixed to lip 54 by screws or the like.

Figure 4:
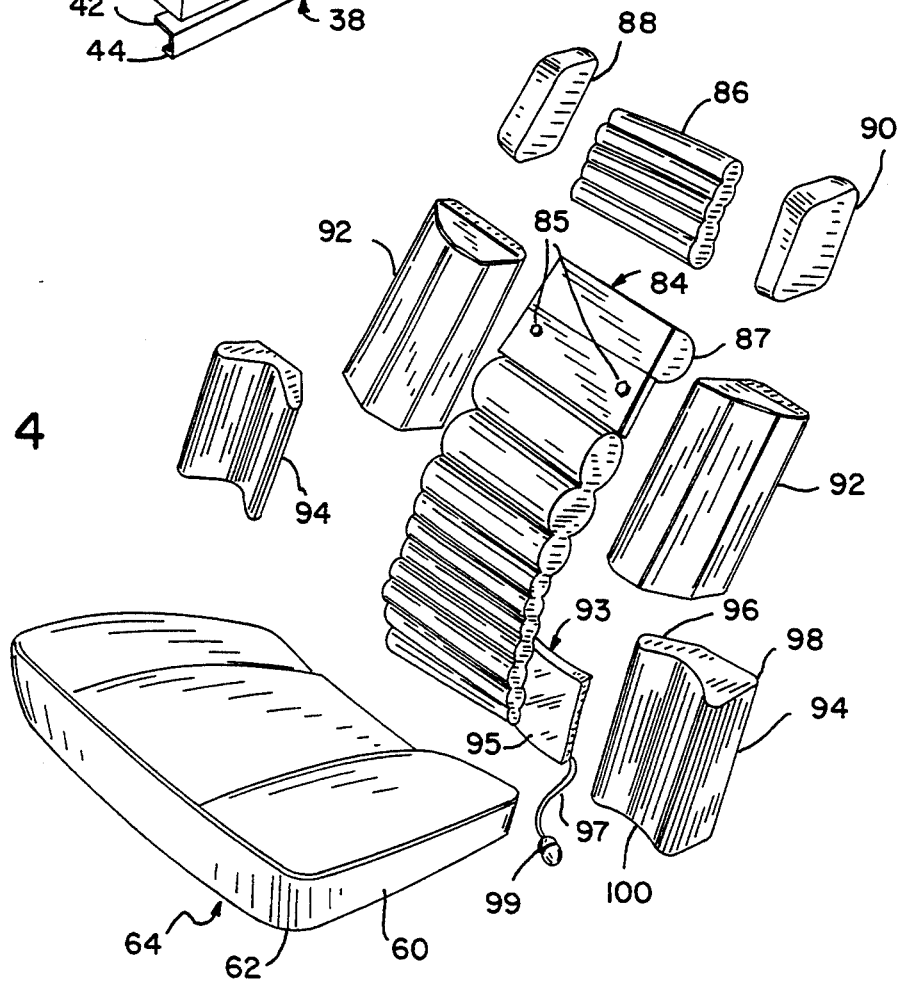
FIG. 4 is an exploded view of the various cushions forming the seating assembly shown in FIG. 1.

Seating assembly 10 also includes a seat cushion 60 which is secured to the seat portion 32 of frame 30. Seat cushion 60 is supported by suspension system 56. Particularly, as shown in FIG. 4, seat cushion 60 having lower edge 62 fits within seat portion 32 of frame 30. Lower edge 62 is dimensioned to fit within open area 51 and rest upon lip 54. Lower edge 62 defines the perimeter of an undersurface 64 of seat cushion 60. When seat cushion 60 is placed into position within seat portion 32, undersurface 64 is supported by suspension system 56, seat cushion 60 is thus wedgingly held within seat portion 32 of frame 30.

As can be seen from FIG. 1, a plurality of cushions are attached to frame 30 to form a back assembly. With particular reference to FIG. 4, it can be seen that the back assembly is formed of several headrest cushions 86, 88 and 90, a back cushion 84, a pair of upper torso cushions 92, and a pair of lower torso cushions 94.

With reference to FIG. 1, seat 12 and lower back region 20 (including the back assembly) form a juncture with an included angle of between about 60° and 120°. The width juncture extends from an inside end 22 of seat 12 to an outside end 24.

Lower back region 20 of back 14 includes recesses 26 and 28. More particularly, inner recess 26 is formed in one of lower torso cushions 94. Likewise, outer recess 28 is formed in the other of lower torso cushions 94. As depicted, recesses 26 and 28 extend from the upper surface of seat 12 to the top of cushion 94. Recesses 26 and 28 serve to accommodate bulky or protruding objects which might be worn on a belt of an occupant using seating assembly 10. For example, recesses 26 and 28 may accommodate objects such as a handgun or the like worn on a police officer's belt or work tools or the like which may be worn on a carpenter's belt. These recesses may be generally configured to accept any of a number of shapes of items worn about the driver's midsection, or may be specifically configured for single-purpose use, at the option of the designer.

Recesses 26 and 28 additionally render seating assembly 10 more comfortable than conventional seating assemblies by providing more space for the occupant in the seating compartment defined by seating assembly 10.

Seating assembly 10 and the components thereof will now be described in greater detail. As best seen in FIG. 3, back portion 34 of frame 30 extends vertically upwardly from seat portion 32. Back portion 34 includes two side bars 66 and 68 terminating at an upper bar 70. A web 72 spans from side bar 66 to side bar 68 and from upper bar 70 to seat portion 32. Web 72 includes a plurality of apertures 74 disposed longitudinally adjacent to side bars 66 and 68. A projection 76 is disposed in the central portion of web 72. Projection 76 is nearly flush with web 72 at the portion adjacent top bar 70 and is inclined to a raised position with respect to web 72 at lower back area 52 in the area adjacent seat portion 32. Central projection 76 includes two horizontal apertures 78 and a lower depression 80. Immediately below depression 80 is a horizontal slot 81 having a length approximately equal to that of projection 76.

Headrest portion 36 of frame 30 extends upwardly from top bar 70. Headrest portion 36 includes longitudinal apertures 82 which are disposed adjacent the perimeter thereof.

While frame 30 is shown as a unitary construction, it is feasible for frame 30 to include one or more separate components which may be fastened together without departing from the scope of the present invention. Nevertheless, in accordance with a preferred embodiment, frame 30 is formed by rotationally molding plastic to yield a unitary design. Such a design has the added benefit of reducing road vibration when seating assembly 10 is employed in a motor vehicle.

Suspension system 56, as shown in FIG. 3, most preferably comprises an elastomeric fabric capable of providing sufficient strength to support seat 60. Suspension system 56 preferably is formed of a material known as Dymetrol®, a registered trademark of the E. I. DuPont de Nemours Company. Other materials, such as other plain weave fabrics can also be employed. Alternatively, suspension system 56 can be formed from conventional materials such as springs, coils or the like. The elastomeric fabric forming suspension system 56 is preferably affixed to rods 55 and 57 by any conventional means. Rods 55 and 57 are then attached to seat portion 32 of frame 30 as shown by attachments 58.

Seat cushion 60 having lower edge 62 is shaped to fit within seat portion 32 and rest upon suspension system 56. As noted above, seat cushion 60 preferably is wedgingly received within open area 51 and rests upon lip 54. Preferably, a hook and loop fastener between the respective components is employed, such as Velcro or the like.

Alternatively, flaps (not shown) may be employed to extend from both the front and back ends of seat cushion 60 so that seat cushion 60 can be strapped to the seat portion 32 of frame 30 and lower back area 52 of back portion 34. The back side flap is passed through horizontal slot 81 and secured to respective grabs 83 disposed at the bottom portion 52 of web 72. Grabs 83 are preferably formed integrally with frame 30 in the same manner as the other features of frame 30. In a similar fashion, the front side flap is passed over front bar 46 and affixed to grabs (not shown) similar to grabs 83. Furthermore, conventional adhering methods may be employed, such as screws, adhesives or the like.

Back cushion 84 is adapted to be removably fastened to central projection 76. As seen best in FIG. 2, back cushion 84 preferably includes an insert 77 formed of a bullet proof or bullet resistant material such that back cushion 84 can be removed from frame 30 and used as a shield or the like. Insert 77 most preferably is embedded within cushion 84, but also may be employed on either the front or back sides of cushion 84. Preferably, insert 82 is formed from one of the class of highly aromatic polyamide fibers derived from phenylenediamine and terephthaloyl chloride or other high strength materials. Exemplary compounds include Kevlar, a registered trademark of the E. I. DuPont de Nemours Company.

Back cushion 84 is preferably mounted to frame 30 so that it can easily and quickly be removed therefrom. In a preferred embodiment, back cushion 84 is affixed to frame 30 by respective locking bolts 85 which cooperate with apertures 78 in projection 76. As shown in FIG. 4, locking bolts 85 are positioned in the uppermost part of back cushion 84 underneath an upper hinged cushion 87. Hinged cushion 87 is adapted to be moved to an open position, such as it is shown in FIG. 4, to permit locking bolts 85 to be locked or unlocked in apertures 78. Once locking bolts 85 are locked or unlocked, hinged cushion 87 can be moved to a closed position so that the cushion portion is facing outwardly. Additional fasteners, such as hook and loop fasteners, may also be utilized as are necessary.

In this manner, back portion 84 can be quickly and easily mounted and quickly and easily removed from seating assembly 10 and be used as a bullet resistant shield and/or vest. In this embodiment, seating assembly 10 is especially suited for use by police officers and other public safety officials.

In a particularly preferred embodiment, back portion 84 is adapted to be carried by each police officer who uses the police motor vehicle in which seating construction 10 is employed. That is, each police officer, at the beginning of his shift, could simply carry back portion 84 to the vehicle and mount it to frame 30. In this manner, excessive wear of seating assembly 10 can be reduced because back portion 84 is not used by each police officer who uses the vehicle.

Headrest cushions 86, 88 and 90 are suitably configured to be affixed to headrest portion 36 of frame 30 as is shown in FIG. 1. Back headrest cushion 86 may be affixed to headrest portion 36 through use of any suitable adhesive or attaching devices. Side headrest cushions 88 and 90 can then be affixed to abut the lateral edges of back headrest cushion 86. Cushions 86, 88 and 90 are suitably attached to render them easily removable such that repair or replacement of any of the cushions is easily facilitated.

Upper torso cushions 92 are secured directly to web 72 of frame 30 such as by bolts or other similar attaching devices placed through apertures 74 in web 72. Thus, upper torso cushions 92 can be easily replaced when they are worn out. Alternatively, if only a component part of cushion 92 is worn out, that part may be individually repaired or replaced after cushions 92 have been removed.

Lower torso cushions 94 are also affixed to web 72 of frame 30, for example by bolts or other attaching devices placed through apertures 74 in web 72. Lower torso cushions 94, as can be seen best from FIGS. 1, 2 and 4, are specially shaped to provide recesses 26 and 28 and thus enlarge the seating compartment in the area of lower back region 20 of back 14 and the rear portion of seat 12. In a preferred embodiment lower cushions 94 include an inner compressed portion 96 and an outer expanded portion 98 with an inclined curved surface 100 spanning therebetween which forms the recesses 26 and 28. When affixed to web 72, inner portion 96 is adjacent back cushion 84 and expanded portion 98 is adjacent side bar 66 or 68. Recesses 26 and 28 are thereby formed in the seating compartment defined by the cushions affixed to frame 30.

As shown best in FIG. 2, each of the cushions is formed in large part by a filler with the cover overlying the filler and defining the shape of the cushion. Preferred fillers include polyurethane foam and densified fiber batting. Conventional cushion material also may be employed, such as fibers, feathers, and foam materials. The cushion covers are preferably formed of a resilient material which is capable of withstanding hostile environments. In particular, the cushion covers should be able to withstand water and other liquid materials and are preferably, to some degree, puncture proof. Preferred covering materials include cloth, nylon, vinyl coated fabrics and mixtures thereof. Preferred fabrics include about 90% wool and 10% nylon. Other conventional coverings, such as leather and the like, may also be employed providing the materials meet or surpass standard automotive seating specifications, such as DOT-302.

Referring again to FIG. 4, seating assembly 10 may optionally include an adjustable lumbar support 93. Lumbar support 93, when employed, is disposed between back cushion 84 and depression 80 of frame 30. Lumbar support 93 includes a flexible impermeable envelope 95 and a plastic tube 97 extending transversely therefrom. An air pump 99 is disposed at the distal end of plastic tube 97, and is used to adjust the volume of air contained within envelope 95. Alternatively, lumbar support may be provided by the combined resilience of a foam cushion containing an air pressure bag such as is disclosed in Smittle, et al., U.S. Pat. No. 3,770,315 issued Nov. 6, 1973.

Seating assembly 10, thus formed, may be mounted in a motor vehicle, or the like. Seating assembly 10 has high structural integrity and low probability of failure as a result of repeated use. When failure does occur, the cushions which are attached to frame 30 may be easily removed and replaced. In this manner, only the cushion which is worn needs to be replaced. For example, if headrest cushion 88 becomes worn, it may be removed without having to remove headrest cushion 86 and 90. Repair of seating assembly 10 is thus more efficient and cost-effective than repair of conventional seating assemblies.

Figure 5:
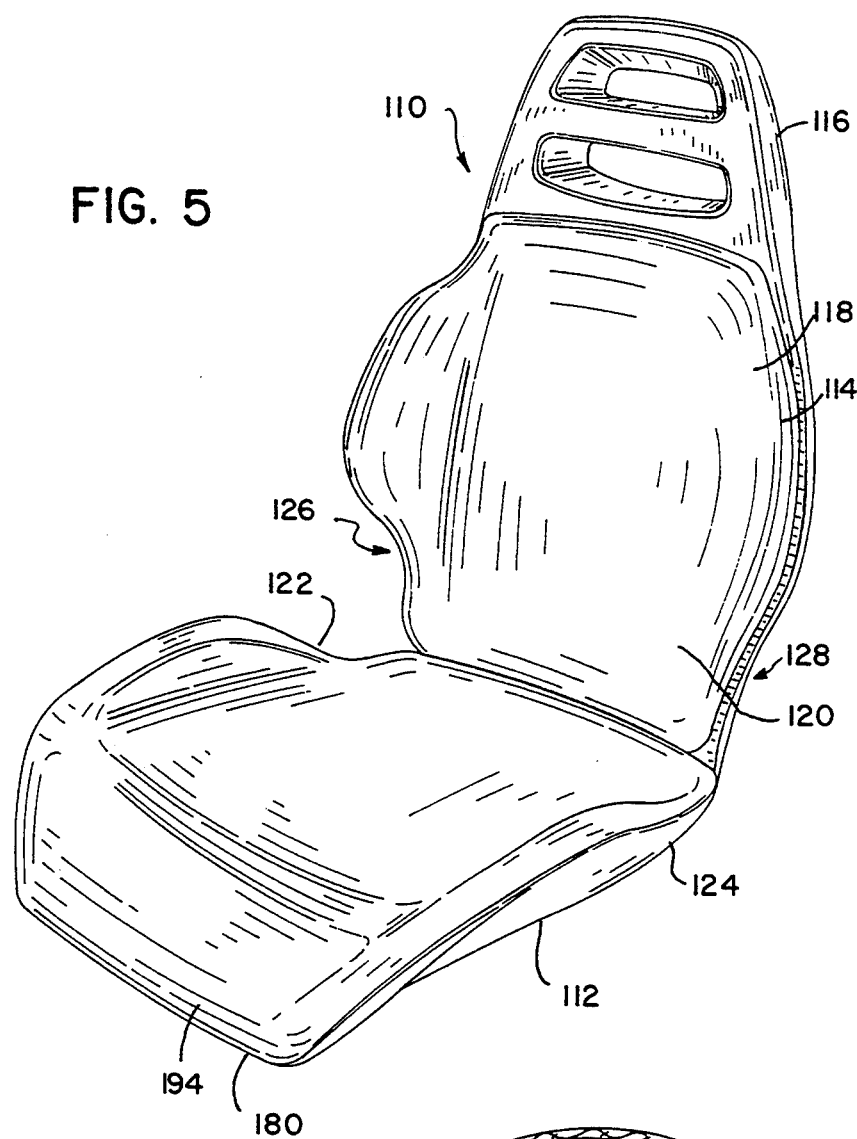
FIG. 5 is a perspective view of another embodiment of the seating assembly of the invention.

Referring now to FIG. 5, an alternative embodiment of the seating assembly of the present invention is denoted generally by the numeral 110. Seating assembly 110 includes many of the same features of seating assembly 10, and for ease of reference these components are simply referred to by the reference numeral used in conjunction with seating assembly 10, modified by adding 100 to it. For example, seating assembly 110 includes a seat 112 and a back 114 having a headrest portion 116, a lower back region 120, and an upper back region 118 spanning therebetween.

Figure 6:
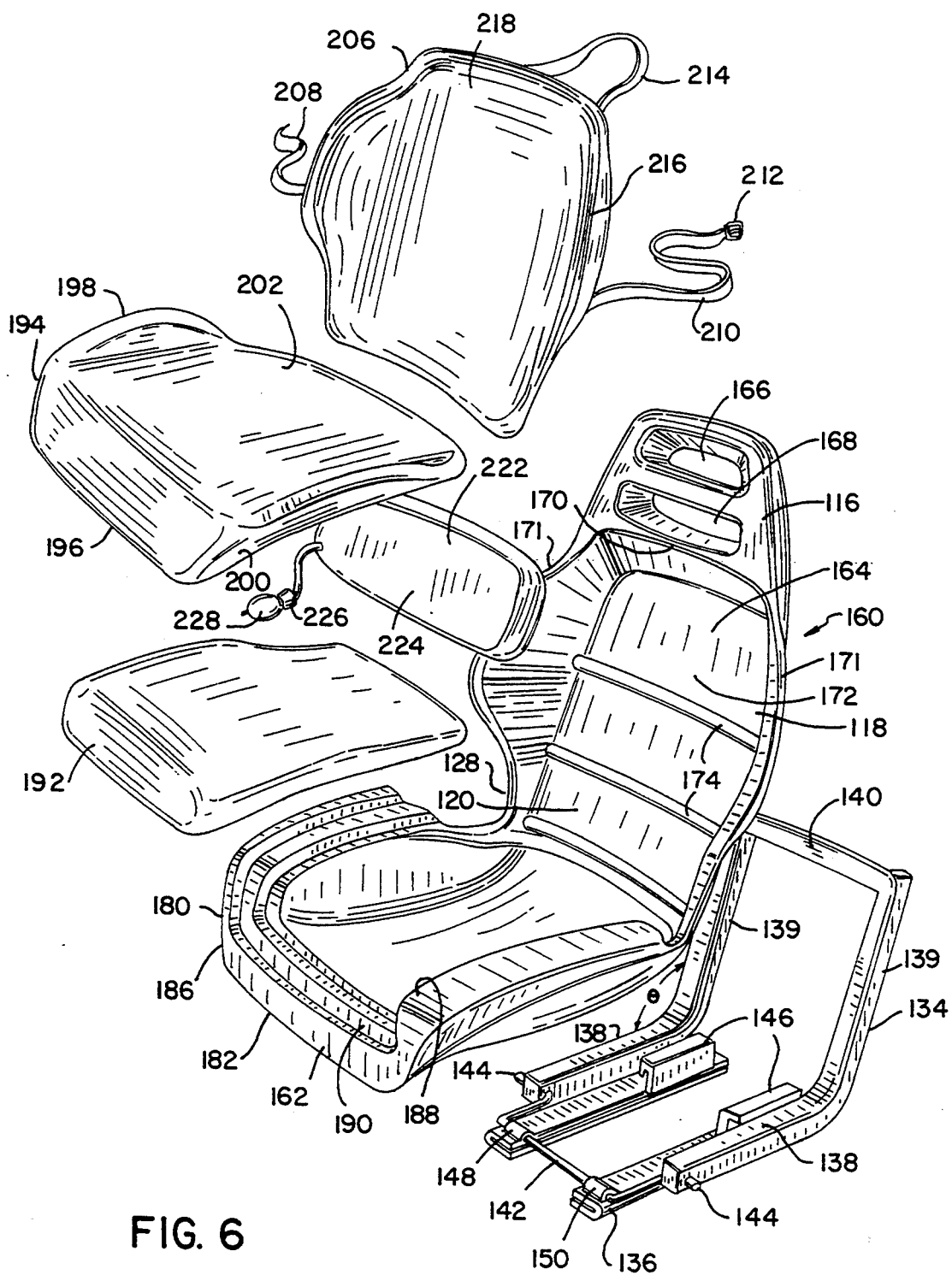
FIG. 6 is an exploded view of the various components of the seating assembly of FIG. 5.

With reference to FIGS. 5 and 6, it can be seen that seating assembly 110 includes a frame 134. Frame 134 includes a base portion and a back portion. Particularly, back portion is formed by a pair of back supports 139 which are integrally joined at the top end thereof with a top support 140 and have an open bottom end. A pair of seat supports 138 are integrally formed with back supports 139. Seat supports 138 define the seat portion of frame 134 having open front and back sides. Seat supports 138 and back supports 139 have an included angle of between about 60° to about 120°. Preferably, the included angle is about 100° to 110°.

Frame 134 cooperates with a mounting base 136. Mounting base 136 secures the combination of frame 134 and shell 160 within a motor vehicle.

Seating assembly 110 also includes a shell 160 which cooperates with and is affixed to frame 134. Together, shell 160 and frame 134 serve to support the components of seating assembly 110. As shown in FIG. 6, shell 160 is preferably formed of a unitary construction having a seat 162 and an integrally formed back 164 extending upwardly from seat 162.

More specifically, back portion 164 includes a headrest portion 116 formed by the uppermost portion of shell 160, a lower back region 120, and an upper back region 118 spanning between lower back region 120 and headrest portion 116. A back cushion 206 is suitably configured to substantially cover back portion 164 of shell 160. Back cushion 206 and back portion 164 of shell 160 cooperate to form a back assembly. The back portion 164 includes two recesses 126 and 128 in the edges of recess in lower back region 120.

Seating assembly 110 also includes a seat cushion 194. Seat cushion 194 is secured to seat 162 of shell 160. Seat cushion 194 substantially covers the entire region from the back portion 160 to the front of seat portion 162. Seat cushion 194 is supported by a suspension system 192 disposed between seat portion 162 and seat cushion 194.

Seating assembly 110 and the components thereof will now be described in greater detail. Frame 134 co-operates with base 136 to permit seating assembly 110 to be reclined without reducing the area behind seating assembly 110, i.e. the back seat area of a motor vehicle. Particularly, at the distal end of respective seat supports 138, an aperture is provided which permits the operator to manipulate respective portions 144 of a bent crank 142. Bent crank 142 is journaled through respective mounts 148 and 150 of mounting base 136, thereby permitting bent crank 142 to rotate about its longitudinal axis. As shown, mounts 148 and 150 may be formed by conventional clips having raised central portions affixed to the upper surface of mounting base 136 such as by screws or the like. In this manner, bent crank 142 is affixed to both frame 134 and mounting base 136.

Frame 134 is also slidably affixed to mounting base 136. In a preferred embodiment respective guides 146 on mounting base 136 include means for slidably affixing frame 134 to mounting base 136. Inwardly directed nubs (not shown) are provided at the juncture of seat portion 138 and back portion 139. The inwardly directed nubs communicate with corresponding grooves in base 136 forming a guide track (also not shown) disposed laterally within respective guides 146 on mounting base 136.

Figure 7A:
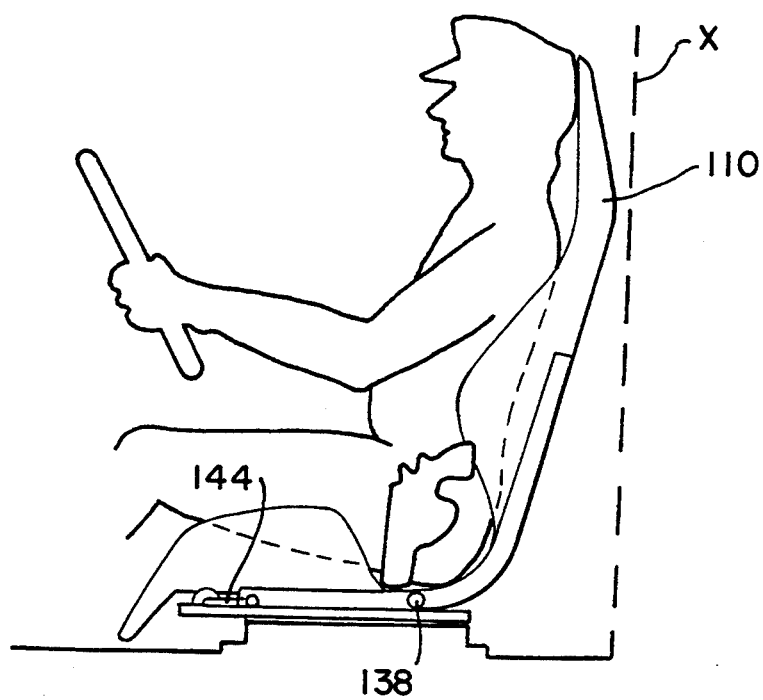
FIGS. 7A and 7B are side views of the seating assembly shown in FIG. 5, illustrating the manner in which the seat can be reclined.
Figure 7B:
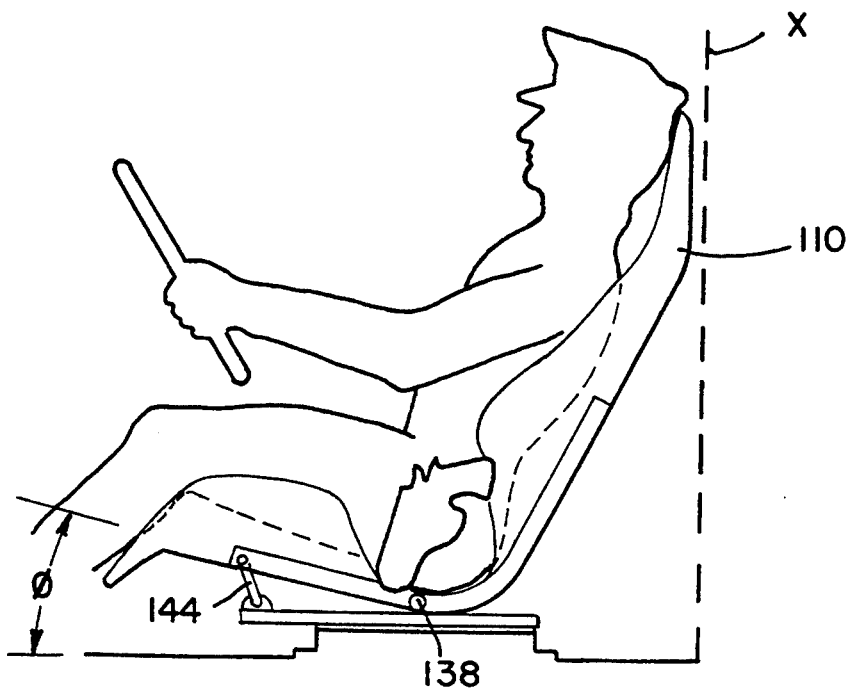

With reference to FIGS. 7A and 7B, the benefits of the aforementioned construction are illustrated. Particularly, FIG. 7A shows seating assembly 110 in the upright, non-reclined position. When seating assembly 110 is in this position, the rearwardmost portion thereof lies approximately within the plane denoted generally by X. When seating assembly 110 is reclined backwards, it can be seen that the rearwardmost portion of seating assembly 110 remains forward of plane X. This is because, when seating assembly 110 is reclined, seat portion 138 is urged forward causing bent crank 142 to rotate and causing the nubs disposed within guides 146 to also move forward. In combination with the configuration of seating assembly 110, and particularly the headrest region 116 thereof, seating assembly 110 can be reclined to increase the comfort of the occupant without decreasing the area directly behind seating assembly 110, such as the back seat area when seating assembly 110 is used in a motor vehicle. Preferably, the angle of recline of seating assembly 110 is between about 5° and 45° and more preferably between about 10° and 30°.

Shell 160 is preferably formed of a plastic material that is rotationally molded to yield a unitary design. In a preferred embodiment, shell 160 is attached to seat supports 138 of frame 134 through the use of bolts (not shown). Alternatively, or in addition, adhesives or the like may be used. Shell 160 is preferably configured so that back supports 139 and top support 140 are received within the shell. That is, shell 160 preferably includes a slot (not shown) into which the back portion of frame 134 can be placed. In this manner, shell 160 is securedly affixed to frame 134 at both the seat and back portions thereof.

A headrest portion 116 is formed in the uppermost portion of shell 160. Decorative apertures 166 and 168 optionally may be formed longitudinally therein. Additionally, a cushion (not shown) may be affixed to headrest portion 116 if desired. The lower portion of headrest portion 116 is defined by an edge 170. As depicted, an outer edge 171 of shell 160 is contoured outwardly from edge 170. Outer edge 171 forms the outer surface of shell 160 and a back web 172 is disposed inwardly of edge 171. As shown, back web 172 extends from seat 162 to edge 170 and is basically of an inverted U-shape. Support ribs 174 extend horizontally across web 172.

As can be seen best in FIG. 6, shell 160 including web 172 spans the area of lower back region 120 of back 114. In lower back region 120, web 172 extends horizontally across the region. Exteriorly of web 172, edge 171 of shell 160 extends outwardly to form the outer contours of lower back region 120, namely recesses 126 and 128. In a preferred embodiment, the recesses 126 and 128 extend from seat 162 to upper back portion 118. While both recesses 126 and 128 are shown, it should be appreciated that only one such recess need be formed in the back assembly. As with recesses 26 and 28 of seating assembly 10, lateral recesses 126 and 128 serve to accommodate bulky or protruding objects which might be worn on a belt of an occupant using seating assembly 110.

As best seen in FIG. 5, back 114 of seating assembly 110 has a contoured configuration in which the widthwise dimensions of the various regions cooperate to form recesses 126 and 128. That is, headrest region 116 and lower back region 120 each have widthwise dimensions which are less than upper back region 118.

Seat portion 162 is integrally formed with back portion 161 of shell 160. As can be seen best in FIG. 6, seat portion 162 is defined by an outer edge 180 which terminates at the back portion of seat 162 in the area of recesses 126 and 128. A seating base 182 is formed interiorly of outer edge 180. Respective side walls 186 and 188 extend upwardly from base 182 to a region proximate outer edge 180. A rim 190 is disposed between outer edge 180 and the upper portion of side walls 186 and 188 and forms a stepwise juncture therebetween. In the front portion of seat 162, rim 190 forms a stepwise juncture between outer edge 180 and base 182.

In a preferred embodiment, suspension system 192 is placed onto rim 190 and affixed thereto by a suitable adhesive. Alternatively, conventional attaching means may be employed, such as screws, tacks, staples, bolts, or the like. As with suspension system 56 of seating assembly 10, suspension system 192 preferably comprises Dymetrol® which is manufactured and sold by the E. I. DuPont de Nemours Company under that trademark. This material provides excellent suspension as well as superior wear and durability.

Seat cushion 194 is supported by suspension system 192 and seat portion 162. Preferably, seat cushion 194 is configured to fit within the stepwise juncture formed by rim 190 with respect to outer edge 180. As shown in FIG. 6, seat cushion 194 includes a tapered lowered front edge 196 and respective upwardly extending side edges 198 and 200. Tapered front edge 196 is suitably configured to cover the front area of seat 162. As shown in FIG. 5, lower edge 196 of seating cushion 194 extends proximate the outer edge 180 of seat 162. In this manner, the back of one's legs sitting in seating assembly 110 is protected from engaging hard shell 160.

Referring again to FIG. 6, upwardly extending edges 198 and 200 of seat cushion 194 terminate at the back edge 202 of seat cushion 194. In this manner, when seat cushion 194 is placed on seat 162 of shell 160, back edge 202 is placed adjacent to back web 172. As shown, back edge 202 is contoured to match the contour of back portion 164 of shell 160.

Back cushion 206 is suitably configured to cover back portion 164 of shell 160. In a preferred embodiment, back cushion 206 is wedgingly received in back portion 164 to provide cushion to the surface of web 172. Particularly, outer peripheral edge 216 of back cushion 206 is configured to be received inwardly of outer edge 171 of back portion 164. In this manner, back cushion 206 is removably secured to shell 160. Alternatively, back cushion 206 may be attached to shell 160 by a hook and loop fastener assembly, snaps or the like.

As with back cushion 84 of seating assembly 10, back cushion 206 includes a bullet resistant insert (not shown) received within the cushion itself. Alternatively, the back side of cushion 206 may be formed of a bullet resistant material. In a particularly preferred embodiment of the present invention, back cushion 206 includes a polyurethane foam, densified fiber batting, a Kevlar insert, and a cushion cover formed of nylon fabric.

As shown in FIG. 6, back cushion 206 is provided with straps 206 and 210. A buckle 212 is disposed on the distal end of strap 210. Additionally, strap 214 is disposed at the top or upper portion of back cushion 206. When back cushion 206 is removed from shell 160 such as in the case of an emergency, these straps enable cushion 160 to be worn as a bullet resistant vest or used as a shield. As a vest, front portion 218 having a cushion cover is configured to be placed up against one's chest. The insert, being formed of a bullet resistant material, such as Kevlar, is thus outwardly directed to protect the wearer from bullets. Strap 214 is advantageously positioned to be placed over the wearer's head. Similarly, straps 208 and 210 are advantageously positioned to secure the mid-portion of back cushion 206 to one's upper torso. Particularly, strap 208 is configured to be threadingly received within buckle 212 disposed on the distal end of strap 210. Strap 208 can be secured in its tightened fashion by any conventional means. Back cushion 206 can also be used as a shield, if desired, and held through use of straps 208 and 210 fastened together. Alternatively, an additional horizontal or longitudinal strap may be placed on the back side of cushion 206 for this purpose.

An optional lumbar support 222 for use in seating assembly 110 is shown in FIG. 6. Lumbar support 222, like lumbar support 104, includes cushioned envelope 224, transversely extending tube 226, and air pump 228 and may be disposed behind back cushion 206 in lower back portion 120.

Seating assembly 110 provides numerous advantages over prior seating assemblies. Particularly, seating assembly 110, like seating assembly 10, accommodates occupants having protruding objects in the mid-torso region, such as objects worn on a belt. Referring to FIGS. 7A and 7B, it can be seen that seating assembly 110 is particularly adapted to be used by a police officer wearing a belt carrying a holster and a gun. As shown, seating assembly 110 is advantageously configured to accommodate a police officer wearing a holster and a gun. The unique configuration of seating assembly 110 is such that outer portions of the seat do not contact the gun while it is in its normal position. Particularly as is shown recess 128 (and similarly recess 126) formed in the juncture of seat 112 and back 114, permits the gun to be disposed therein free from contact with the back 114 or seat 112.

Additionally, seating assembly 110, in its preferred embodiment, is capable of withstanding hostile environments. Particularly, cushions 206 and 198, being formed of wear resistant material, advantageously increase the life of seating assembly 110.

Moreover, seating assembly 110 is formed of a simple yet efficient construction. With only a few component parts, seating assembly 110 can be quickly and easily assembled and disassembled for maintenance or replacement.

In the embodiment of the invention shown in FIGS. 8, 9, 10 and 11 the seat assembly 50 has been modified to include a frame 260, a shell 270 supported on the frame 260, a support assembly 292 secured to the shell 270 and a cushion assembly 300 supported on the assembly 292. The frame 260 is slidably affixed to mounting base 136 as noted above. In this regard the mounting base 136 includes a pair of mounts 148 and 150 having a pair of guides 146 mounted in a spaced parallel relation on the end of the mounts 148 and 150. The bent crank 142 is pivotally connected to the other end of the mounts 148 and 150 with the ends 144 of the crank 142 journaled in the frame 260. The inwardly directed nubs 145 on frame 260 are aligned in the guides 146 which allows the frame 260 to tilt as the crank 142 pivots on the mounts 148, 150.

Figure 9:
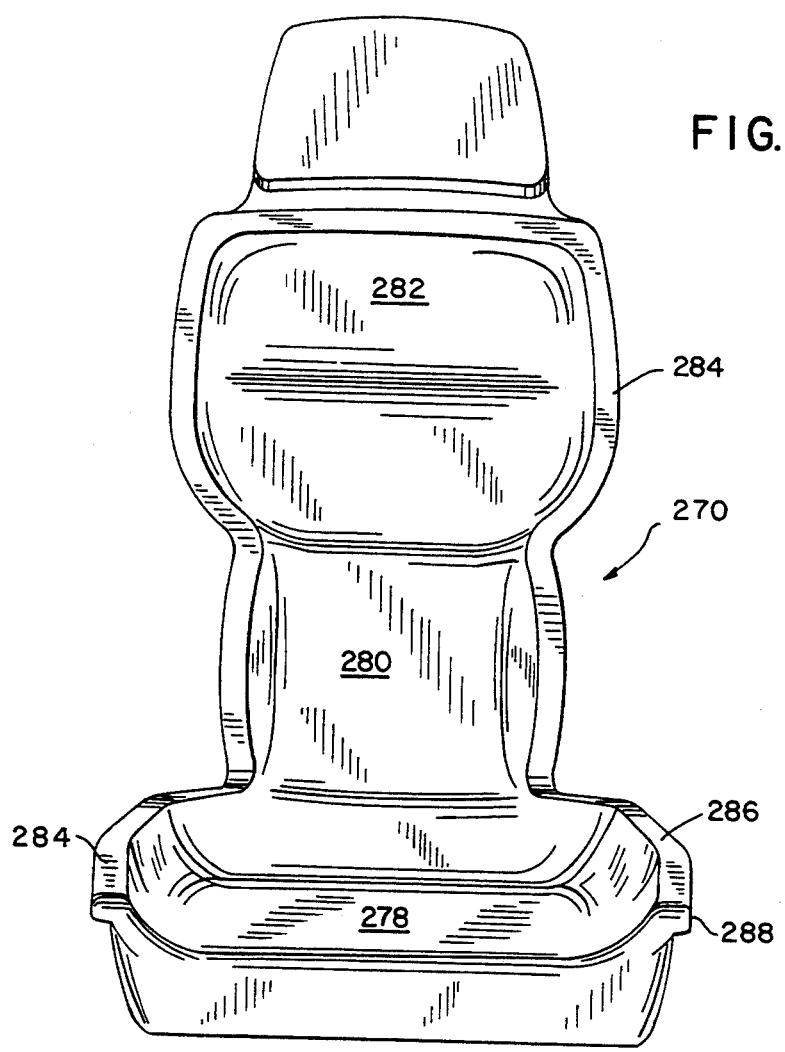
FIG. 9 is a front view of the shell for the modified seat assembly.
Figure 11:
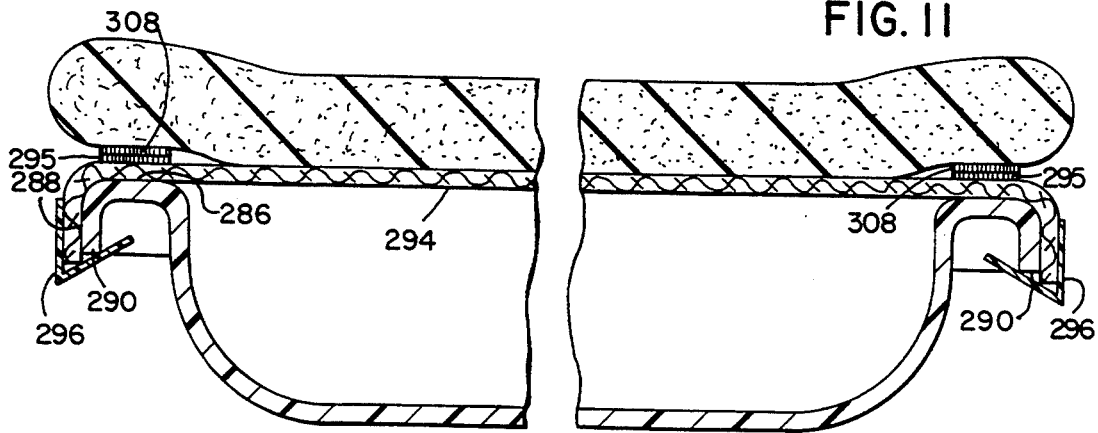
FIG. 11 is a cross-sectional view of the seat assembly.

More particularly and referring to FIG. 10, the frame 260 includes a pair of angle irons 262 on each side of the base which are interconnected by cross members 264, 266 and 268. The shell 270 is a unitary rotationally molded plastic piece which includes three parallel mounts 272, 274, 276 which are aligned with and positioned to matingly engage the cross members 264, 266 and 268, respectively. The parallel mounts may be secured to the cross members 264, 266 and 268 by bolts or by an adhesive. As shown in FIG. 9 the shell 270 includes a seat section 278, a lumbar section 280 and a back section 282. A ridge or rim 284 is provided around the entire outer periphery of the shell 270. A cross section of the rim 284, as shown in FIG. 11 includes a flat surface 286, a side surface 288 and a ridge 290.

A support assembly 292 is provided for each of the seat, lumbar and back sections of the shell. In this regard each support assembly includes a strip of elastomeric fabric 294 such as Dymetrol ®, a registered trademark, which has a plastic clip 296 secured to two opposed edges of the piece of fabric. Each clip 296 is pulled over the ridge 290 on each side of the shell and secured to the underside of the ridge 290 on each side of each section. A strip of Velcro 295 is secured to each edge of the piece of fabric which overlies the flat surface 286 of rim 284.

The cushion assembly 300 also includes three cushions. A seat cushion 302, a back cushion 304 and a lumbar cushion 306. Each cushion is provided with a Velcro strip 308 on each side of the back of the cushions in a position to engage the Velcro strip 295 on the edges of the fabric pieces 294.

The lumbar cushion 306 may be in the form of an expandable cushion which can be inflated to fit the back of the occupant of the seat. It should also be noted that the lumbar cushion has a width less than or equal to the width of the lumbar section of the shell to provide a recess on each side of the lumbar section between the seat section and the back section. As noted above, these recesses allow for the occupant to wear a heavy duty belt for supporting any of a number of devices, such as a holster for a gun or tool. A ballistic cushion 310 similar to cushion 84 is seated and retained in the back cushion 304 by means of Velcro strips as noted above. The ballistic cushion is provided with straps 312 to support the cushion on the front of the body.

Figure 12:
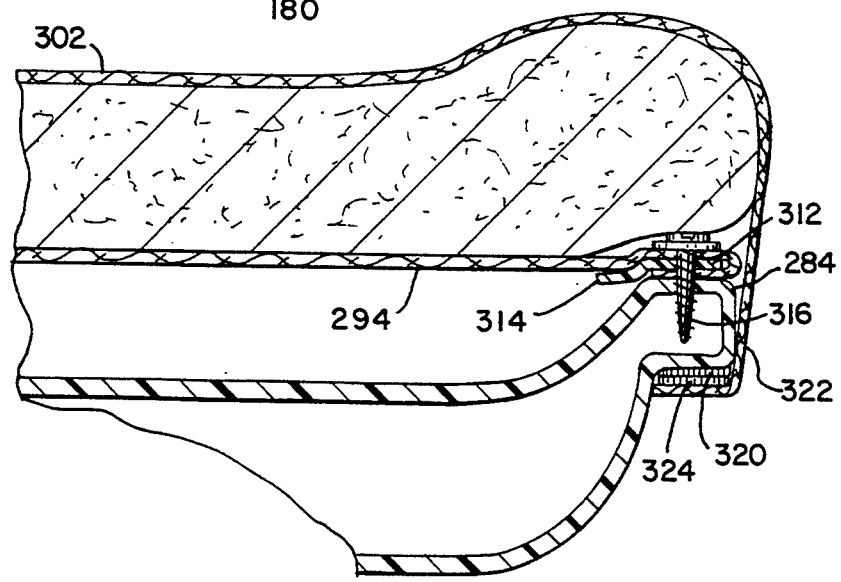
FIG. 12 is a view of an alternate system for securing the support assemblies and cushions to the seat shell.

In an alternate arrangement as shown in FIG. 12, the support assembly for the seat, lumbar and back sections is secured directly to the rim 284. In this embodiment, a plastic strip 312 is enclosed in the edges of the elastomeric fabric 294 by overlapping the strip 312 and stitching the edge 314 of the overlapping strip to the fabric. The strip 312 is then secured to the rim 284 by screws 316. The cushion 302, as well as cushions 304 and 306, are removably secured to the rim 284 by securing a Velcro strip 320 to the bottom of the rim 284. A strip of material 322 is secured to the edges of the cushions and a Velcro strip 324 secured to the end of the strip 322. The Velcro strip 324 is pressed into engagement with the Velcro strip 320 to hold the cushion in place.

It will be understood that the foregoing description of the invention with reference to the preferred embodiments of the invention is not intended to limit the invention to the specific forms shown herein. Various modifications may be made in the design and construction of the components of the seating assembly of the present invention without departing from the scope of the invention as specified in the appended claims.

The embodiments of the invention in which an exclusive property or privilege is claimed are defined as follows:

1. A seating assembly for use in a motor vehicle wherein the occupant normally wears a belt for supporting one or more objects, said assembly comprising:
   a frame having a base and a back;
   mounting means for securing said frame within a motor vehicle;
   a shell secured to said frame; and,
   a cushion assembly secured to said shell, said cushion assembly having a back section, a seat section and a lumbar section intermediate the back section and the seat section, said lumbar section having a width less than the width of said back section and seat section to provide a recess on each side of said lumbar section between the seat section and back section to accommodate an object carried on the occupant's belt.

2. The seating assembly of claim 1, wherein said back cushion includes a recess and a removable ballistic cushion seated in said recess in said back cushion.

3. The seating assembly of claim 1, wherein said lumbar section is adjustable to conform to the lower back of the occupant.

4. A seat assembly for use by an occupant of a vehicle who normally wears a utility belt having various holstered items secured to the belt, said assembly comprising:
   a frame having a base and a back,
   a molded shell mounted on said base and said back, said shell including a seat section, a lumbar section and a back section, said lumbar section having a width narrower than said seat section and said back section to form a recess on each end of said lumbar section between the seat section and back section,
   an elastomeric fabric suspended over the seat section, lumbar section and back section and a seat cushion supported on said fabric over said seat section, a back cushion suspended on said fabric over said back section, and a lumbar cushion supported on said fabric over said lumbar section, said lumbar cushion having a width corresponding to the width of said lumbar section to provide a recess at each end of the lumbar section between the seat section and back cushion.

5. The seat assembly according to claim 4 including means for selectively inflating said lumbar section.

6. The seat assembly according to claim 5 including a pocket in the center of said back cushion and a bullet resistant shield removably mounted in said pocket whereby said shield can be removed from said back cushion for defensive purposes by the occupant.

7. The seat assembly according to claim 4 including means for adjustably mounting said frame in the vehicle whereby the back of the frame remains in a vertical plane when moved between a driving position and a resting position.

8. The seat assembly according to claim 7 wherein said cushions are removable for replacement or repair.

9. A car seat comprising a frame, a shell mounted on said frame, a rim provided around the perimeter of said shell, a support assembly secured to said rim and a cushion assembly mounted on said support assembly, said shell includes a seat section, a lumbar section and a back section, said lumbar section having a width smaller than the width of said seat section and said back section to form a recess on each end of the lumbar section and said support assembly includes a seat cover spanning said seat section, a lumbar cover spanning said lumbar section, and a back cover spanning said back section.

10. The seat according to claim 9 wherein each of said covers includes means for securing the edges of said covers to said rim on each side of said seat, back and lumbar sections.

11. The car seat according to claim 10 wherein said securing means comprises a clip secured to each edge of each of said covers.

12. The car seat according to claim 9 wherein said cushion assembly includes a seat cushion supported by said seat cover, a lumbar cushion supported by said lumbar cover, and a back cushion supported by said back cover.

13. The car seat according to claim 12 wherein each of said cushions includes means for removably connecting the seat cushion, the lumbar cushion and the back cushion to said rim.

14. The car seat according to claim 13 wherein said back cushion includes a central recess and further including a bulletproof cushion removably mounted in said recess.

* * * * *